(12) United States Patent
Boguslawski

(10) Patent No.: US 9,085,257 B2
(45) Date of Patent: Jul. 21, 2015

(54) STEP APPARATUS

(71) Applicant: John Boguslawski, Fall Creek, ID (US)

(72) Inventor: John Boguslawski, Fall Creek, ID (US)

(73) Assignee: Bosski, Inc., Fall Creek, ID (US)

( * ) Notice: Subject to any disclaimer, the term of this patent is extended or adjusted under 35 U.S.C. 154(b) by 10 days.

(21) Appl. No.: 13/921,198

(22) Filed: Jun. 18, 2013

(65) Prior Publication Data

US 2014/0369794 A1    Dec. 18, 2014

(51) Int. Cl.
| | | |
|---|---|---|
| *B60R 3/00* | (2006.01) | |
| *B60P 1/43* | (2006.01) | |
| *E06C 5/02* | (2006.01) | |

(52) U.S. Cl.
CPC .... *B60P 1/43* (2013.01); *E06C 5/02* (2013.01)

(58) Field of Classification Search
USPC ...................................... 280/163, 164.1, 166
See application file for complete search history.

(56) References Cited

U.S. PATENT DOCUMENTS

| | | | | |
|---|---|---|---|---|
| 3,756,622 A | * | 9/1973 | Pyle et al. ..................... | 280/166 |
| 4,388,983 A | | 6/1983 | Bartels et al. | |
| 4,535,871 A | | 8/1985 | Lapeyre | |
| 6,003,633 A | * | 12/1999 | Rolson .......................... | 182/127 |
| 6,017,045 A | * | 1/2000 | Dermody ...................... | 280/169 |
| 6,666,456 B1 | | 12/2003 | Swankie | |
| 6,942,271 B1 | * | 9/2005 | Jamison et al. ................. | 296/61 |
| 7,179,042 B1 | * | 2/2007 | Hartmann et al. ............ | 414/537 |
| 7,401,798 B2 | * | 7/2008 | Dolan ........................... | 280/163 |
| 7,422,263 B2 | | 9/2008 | Pritchard | |
| 7,637,518 B2 | * | 12/2009 | Adair ......................... | 280/164.1 |
| 7,708,294 B2 | * | 5/2010 | Demick ..................... | 280/164.1 |
| 7,717,445 B2 | * | 5/2010 | Peterson et al. ........... | 280/164.1 |
| 7,967,311 B2 | * | 6/2011 | Phillips ....................... | 280/166 |
| 8,006,803 B2 | | 8/2011 | Guering | |
| 8,261,880 B1 | | 9/2012 | Hop | |
| 8,322,739 B1 | | 12/2012 | Fair et al. | |
| 2002/0154980 A1 | * | 10/2002 | Potts ............................. | 414/462 |
| 2002/0163157 A1 | * | 11/2002 | Beck .......................... | 280/164.1 |
| 2008/0159838 A1 | * | 7/2008 | Sherer ........................... | 414/537 |
| 2009/0008896 A1 | * | 1/2009 | Phillips ........................ | 280/166 |
| 2009/0056041 A1 | * | 3/2009 | Wilson ........................... | 14/71.1 |
| 2009/0183946 A1 | | 7/2009 | Prebola | |
| 2012/0009050 A1 | * | 1/2012 | Pepin ............................ | 414/537 |
| 2012/0313343 A1 | | 12/2012 | Fletcher | |
| 2013/0343847 A1 | * | 12/2013 | Freeman ....................... | 414/523 |
| 2014/0125082 A1 | * | 5/2014 | Wendinger et al. .......... | 296/37.6 |
| 2014/0369794 A1 | * | 12/2014 | Boguslawski ................ | 414/373 |

* cited by examiner

*Primary Examiner* — Jeffrey J Restifo
(74) *Attorney, Agent, or Firm* — Miller Nash Graham & Dunn LLP; Chandra E. Eidt

(57) ABSTRACT

An apparatus and method for a step apparatus includes a post device, at least one step platform, and a hitch connecting device. Step platform includes a rectangular loop and two parallel plates, each of the parallel plates connecting on a first end to opposing side walls, respectively, of the post device and on a second end to the rectangular loop. The hitch connecting device connects the post device to a transport vehicle.

11 Claims, 2 Drawing Sheets

STEP APPARATUS

TECHNICAL FIELD

This disclosure relates to an apparatus and method for a collapsible step apparatus, and more specifically relates to a collapsible step apparatus for assisting people in gaining access to or the loading of recreational vehicles or equipment onto a transport vehicle.

BACKGROUND

Some transport vehicles, such as pickup trucks, include tailgates that, when opened, are thirty or more inches above the ground upon which the vehicles are parked. In many cases it is difficult for someone to climb into and out of the vehicle bed, especially if one is elderly, disabled, or has bad knees. It is also hard to load recreational vehicles, such as motorcycles, or wheeled power equipment, such as lawnmowers or rototillers, in and out of the vehicle bed.

Ramps may be used to more easily access the vehicle bed or load recreational vehicles or other heavy equipment onto transport vehicles. One way to load or unload a recreational vehicle is by driving it up or down a ramp. This can be dangerous, especially if the recreational vehicle is a motorcycle, for several reasons. Depending on the width of the ramp, the driver may tip the cycle over while maneuvering on the ramp or accidentally drive the motorcycle off the edge of the ramp. Furthermore, the ramp may be unstable or jarred loose from the bed of the truck. In each case, injury to the driver or damage to the motorcycle often results.

Alternatively, a motorcycle with its engine off may be pushed up or down the ramp by one or more people when loading or unloading the cycle. However, most motorcycles are relatively heavy and cumbersome and are therefore very difficult to maneuver, especially on an inclined surface, with a person guiding it from the side. Damage to the motorcycle and injury to the person again often results.

In addition to having safe way to climb into or out of the bed of the truck or load a recreational vehicle or heavy equipment, it is desirable to use a ramp that is easy to store, easy to attach to a truck, and one that provides traction.

Thus, there is a need of a step apparatus that provides a safe way to climb into or out of a truck, can aid in loading a recreational vehicle or heavy equipment, that is easy to store, easy to attach to a truck, and one that provides traction.

SUMMARY

A step apparatus includes a post device, at least one step platform, and a hitch connecting device. The post device has a first end, a second end, opposing side walls and a front wall. Step platform includes a rectangular loop and two parallel plates, each of the parallel plates connecting on a first end to the opposing side walls, respectively, of the post device and on a second end to the rectangular loop. The post device is thus separated from the rectangular loop, but coupled to the rectangular loop through the parallel connecting plates. The hitch connecting device is coupled to the first end of the post device, and connects the post device to a transport vehicle.

The step apparatus allows for an easy and safe way to climb into or out of a transport vehicle. Also, when used in conjunction with a loading ramp, the step apparatus allows a person to load or unload recreational vehicles or heavy equipment from the side. The step apparatus is easy to store, and easy to attach to a truck. Furthermore, the rectangular loop and parallel plates provide traction as step platforms.

The foregoing and other features will be apparent from the following more particular description, as illustrated in the accompanying drawings.

BRIEF DESCRIPTION OF DRAWINGS

The disclosure will be described in conjunction with the appended drawings, where like designations denote like elements, and.

DETAILED DESCRIPTION

Figure 1:
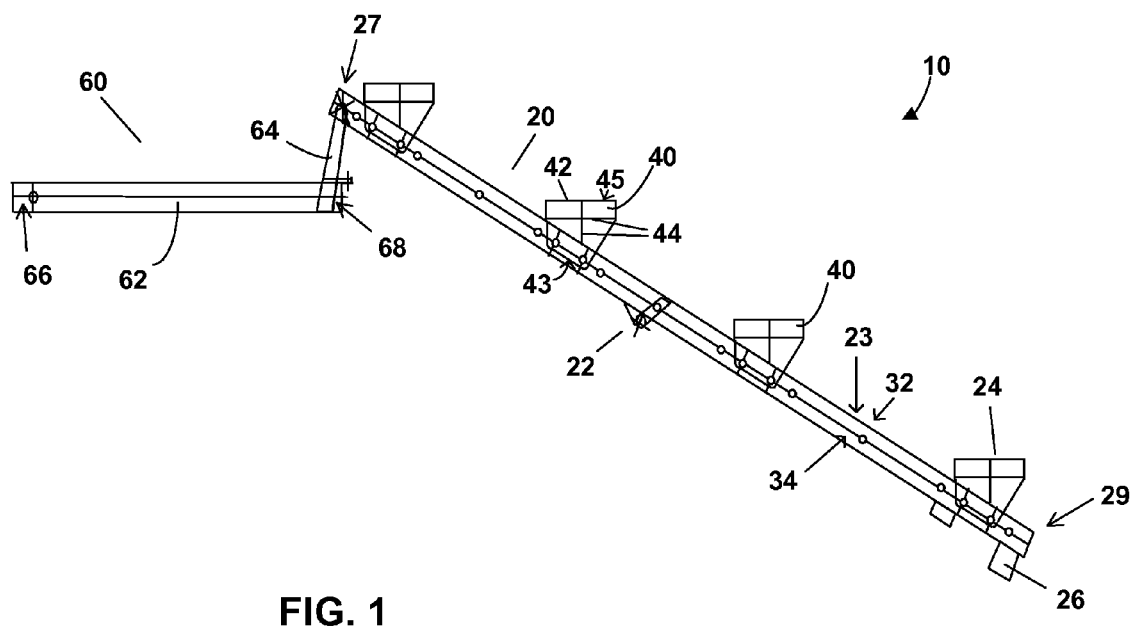
FIG. 1 is a perspective view of a step apparatus.
Figure 4:
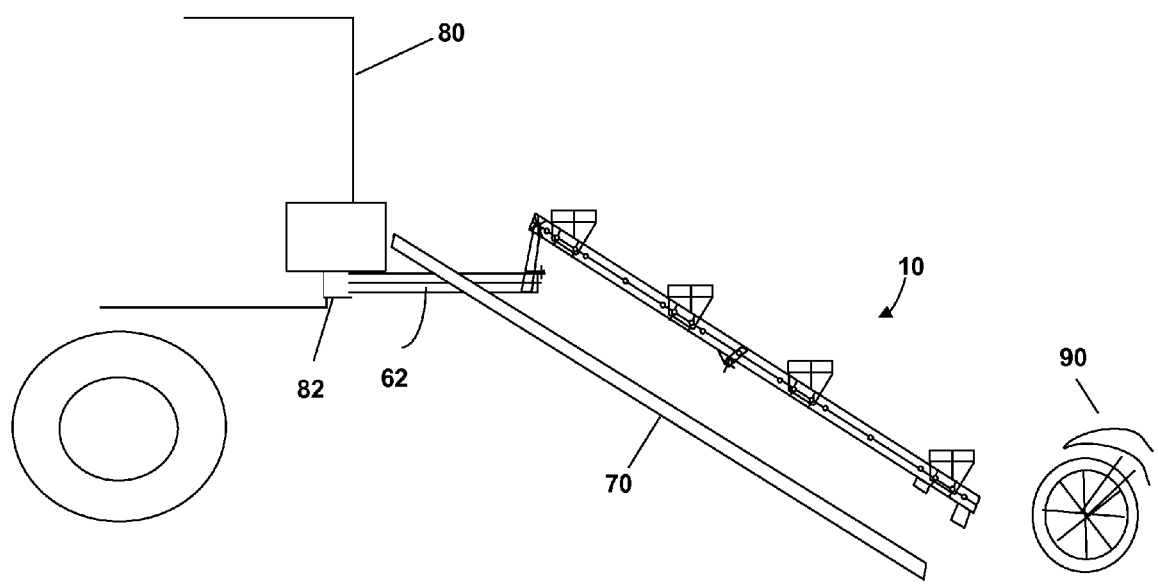
FIG. 4 is a ramp system including the step apparatus of FIG. 1.

As seen in FIG. 1, a step apparatus 10 is shown comprising a post device 20, at least one step platform 40 and a hitch connecting device 60. Step apparatus 10 is structurally configured to attach to a receiver-type hitch (as shown in FIG. 4, element 82) on a truck or similar vehicle, providing a ramp with step platforms for a person to easily walk up and down. This is especially useful if the person is elderly or disabled. If placed alongside a motorcycle ramp, or other similar ramp, step apparatus 10 allows a person to easily load/unload a motorcycle or other wheeled equipment when guiding the motorcycle or other wheeled equipment from a side position.

Post device 20 of step apparatus 10 consists of two square posts connected by hinge 22 to form a single post that, when desired, folds for easy carrying and storage. Although square posts are specifically described, other shapes may be used, such as rods or poles, and are within the scope of the invention. Also, although a single post is formed in this specific example, more than one post may be formed. Post device 20 comprises a first end 27, a second end 29, side walls 32, 34, and a front wall 23. A multitude of holes are located on side walls 32, 34 of post device 20 where connecting hinges (such as hinge 22) and step platform 40 may be located. These holes may allow for adjustability of the placement of step platform 40. When post device 20 is unfolded and placed correctly, hinge 22 is structurally configured to prevent post device 20 from collapsing while opened and people are on it.

Post device 20 also comprises a base post 26, which is attached perpendicular to post device 20 on second end 29 of post device 20. Base post 26 is longer than the width of post device 20 to provide steadiness. Thus, base post 26 allows for both stability and protection of post device 20 against objects on the ground. Base post 26 is affixed to second end 29 of post device 20 by welding, screws, or other fixation means.

Post device 20, when extended and inclined from a transport vehicle to the ground, is at a predetermined length that produces an incline that is suitable for loading equipment and motorized vehicles into the transport vehicle. An example of a predetermined length and suitable angle are 1679 millimeters (mm) and 26 degrees, respectively. In this specific example, hinge 22 may be located approximately 920 mm from second end 29 to allow for a compact single pole stepped ramp 10 when folded. Although specific measurements are given, it is to be understood that the invention is not limited by those measurements, and any other suitable measurements may also be used.

First end 27 of post device 20 connects to a hitch connecting device 60. Hitch connecting device 60 comprises a hitch connector 62, having a first end 66 and a second end 68, and connecting hinge 64. First end 66 of hitch connector 62 attaches to a receiver-type hitch (element 82 in FIG. 4) of a transport vehicle. Hitch connector 62 is structurally configured to connect to a specific sized receiver, for example, a two inch receiver-type hitch. Hitch connector 62 may be secured to a receiver-type hitch through a pin, screw or similar fixation means. Hitch connector 62 is long enough to allow for a tailgate to be open on a transport vehicle while loading or unloading with a step apparatus 10. One example of a specific length for hitch connector 62 is 720 mm, but other suitable lengths may be used that are within the scope of the invention. Hitch connector 62 is normally not permanently attached, but can still allow for step apparatus 10 to stow on a transport vehicle during transport by using hinge 22, connecting hinge 64 and a safety pin. When stowed, a positive pressure is maintained on step apparatus 10 to keep it from rattling during transport. Furthermore, step apparatus 10 may be stowed for transport on a transport vehicle with a tailgate down to allow over-sized objects to use the tailgate as floor space.

Connecting hinge 64 is moveably coupled to first end 27 of post device 20 and to second end 68 of hitch connector 62. That is, each connection of connecting hinge 64 forms a pivot point that automatically adjusts the angle of post device 20 from the height of the transport vehicle to the ground. Thus, step apparatus 10 may be used with all types and elevations of transport vehicles and uneven ground.

Figure 2:
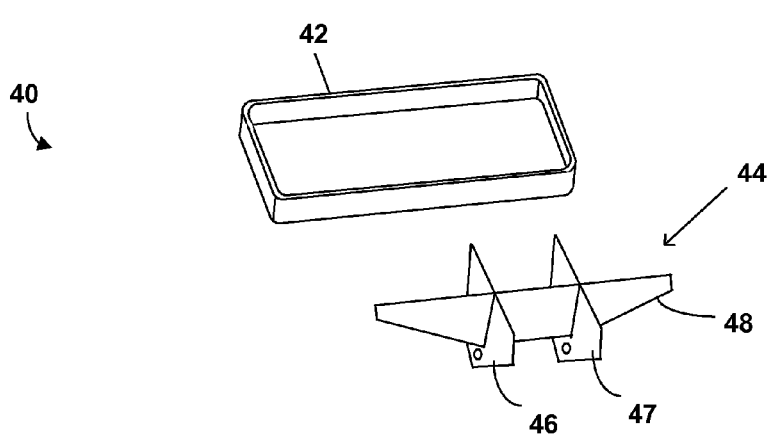
FIG. 2 is an exploded view of a step platform of step apparatus of FIG. 1.

As shown in FIG. 1 and FIG. 2, stepped platform 40 of step apparatus 10 comprise a rectangular loop 42 and connecting plates 44. Rectangular loop 42 provides the outside edges of stepped platform 40, and has a width typically of about 5 to 12 inches, although other suitable widths may be used to accommodate the usual range of feet sizes and the invention is not limited to such. Also, although a rectangular shape is the shape described herein, other shapes may be formed, such as a circle, heart, or blob, and the invention is not limited to a rectangle. Connecting plates 44 are formed from three plates, namely, parallel plates 46, 47 and cross plate 48.

Parallel plates 46, 47 are of a trapezoidal shape, each with a first end 43 that is slanted (the triangular section of the trapezoidal shape) coupling to a respective side wall 32, 34 of post device 20 and a second end 45 that is straight (the square/rectangular section of the trapezoidal shape) coupling to rectangular loop 42. When coupled, parallel plates 46, 47 straddle front wall 23 of post device 20 and outwardly extend rectangular loop 42 from post device 20. The trapezoidal shape of parallel plates 46, 47 allows rectangular loop 42 to remain substantially parallel to the ground while post device 20 is on an incline.

Cross plate 48 perpendicularly crosses through parallel plates 46, 47. A first end 53 of cross plate crosses though a corner section of first end 43 of each of parallel plates 46, 47 and a second end 55 crosses through the middle of each second end 45 of parallel plates 46, 47. Again, this is possible through the trapezoidal shape of parallel plates 46, 47.

Figure 3:
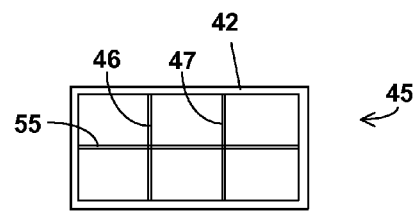
FIG. 3 is a top view of step platform of FIG. 2.

As seen in FIG. 3, a top view of second end 45 of the parallel plates 46, 47 and second end 55 of cross plate 48 shows an H pattern with extended ends. This H pattern connects to rectangular loop through the extended ends. Thus, an open tread is formed that not only allows for support of a person's feet, but increases traction by allowing mud, snow, dirt, etc. to fall through the spaces. Rectangular loop 42 is affixed to parallel plates 46, 47 and cross plate 48 by welding, screws, or other fixation means, or may be formed using methods such as casting. Parallel plates 46, 47 are affixed to side walls 32, 34 of post device 20 through screw, or other fixation means, and is adjustable depending on the how many step platforms are used and where they are to be located. Although four step platforms are shown specifically in this example, any amount of step platforms that is reasonable may be used and the invention is not limited to four.

All elements of step apparatus 10, including post device 20, stepped platform 40, and hitch connecting device 60, are manufactured from a rigid material preferably a strong metal such as steel, steel with a powder coated finish, aluminum, or metal alloys, composites, strong polymers, wood, or any rigid plastic or composite material that can withstand significant pressure.

Because of hinge 22 and connecting hinge 64, step apparatus 10 is easily folded up to be compact and lightweight for easy storage on a shelf in a garage or inside a truck cab for security.

FIG. 4 shows a ramp system for loading and unloading a wheeled device 90, such as a motorcycle, onto a transport vehicle 80. Step apparatus 10 is connected to transport vehicle 80 through hitch connector 62 being secured to receiver-type hitch 82 of transport vehicle 80. As aforementioned, hitch connector 62 is long enough to allow for a tailgate to be open on transport vehicle 80 while loading or unloading with step apparatus 10. In this specific example, a loading ramp 70 is parallel to and in close proximity to step apparatus 10. Loading ramp 70 may be any known ramp in the field that is used to load and unload cargo, such as heavy wheeled equipment or recreational vehicles. When step apparatus 10 is used in conjunction with loading ramp 70, after both the step apparatus 10 and loading ramp 70 are secured to transport vehicle 80 side-by-side, a person may guide wheeled vehicle 90 up loading ramp 70 from the side while stepping on step apparatus 10. Also, more than one loading ramp 70 may be used in conjunction with step apparatus 10. For example, two loading ramps may be placed on each side of step apparatus 10. Thus, a person can follow and/or push a wheeled vehicle, like a wagon, or any wheeled powered equipment, for example a mower or tiller, up the two loading ramps while stepping between on step apparatus 10.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, although motorcycles are specifically disclosed in the present disclosure, it is to be understood that any type of small recreational vehicle or wheeled equipment may also loaded with the invention and the disclosure is not limited to such. Therefore, reference herein to motorcycles is only by way of example, and is not intended to be limiting.

What is claimed is:

1. A step apparatus comprising:
    a post device having a first end, a second end, opposing side walls, and a front wall;
    at least one step platform, the step platform comprising a rectangular loop angled from the post device and two parallel plates, having a first end and a second end, each of the parallel plates connecting on the first end to the opposing side walls, respectively, of the post device and on the second end to the rectangular loop, wherein the post device is separated from the rectangular loop by the parallel connecting plates; and
    a hitch connecting device, coupled to the first end of the post device;
    wherein each of the parallel plates have a trapezoidal shape with a triangular end and a rectangular end, the triangular end being coupled with the side walls of the post device and the rectangular end being coupled with the rectangular loop, wherein the rectangular loop is parallel to the ground when the post device is angled to the ground.

2. The apparatus of claim 1, wherein the post device further comprises: a hinge, wherein the hinge is between the first and second end of the post device and the hinge folds the post device into two posts.

3. The apparatus of claim 1, further comprising:
a base post connected to the second end of the post device, wherein the base post is perpendicular to the post device.

4. The apparatus of claim 1, wherein the parallel plates straddle and extend outward from the front wall of the post device.

5. The apparatus of claim 1 further comprising: a connecting hinge, the connecting hinge connecting the hitch connecting device to the first end of the post device, wherein the connecting hinge adjusts an angle of the post device to the ground.

6. The apparatus of claim 1, wherein there are four of the at least one step platform.

7. The apparatus of claim 1, wherein the stepped platform device further comprises: a cross plate, the cross plate being perpendicular to the parallel plates, crossing through the middle of the second end of the parallel plates, and connecting to the rectangular loop.

8. A ramp system for loading and unloading a wheeled device onto a transport vehicle comprising:
a step apparatus comprising:
a post device having a first end, a second end, opposing side walls, and a front wall;
at least one step platform, the step platform comprising a rectangular loop angled from the post device and two parallel plates, having a first end and a second end, each of the parallel plates connecting on the first end to the opposing side walls, respectively, of the post device and on the second end to the rectangular loop, wherein the post device is separated from the rectangular loop by the parallel connecting plates; and
a hitch connecting device, coupled to the first end of the post device; and
a loading ramp parallel to and in close proximity to the step apparatus, the step apparatus and the loading ramp for attaching to the transport vehicle, wherein the wheeled device is guided from a side position up the loading ramp while stepping on the step apparatus;
wherein each of the parallel plates has a trapezoidal shape with a triangular end and a rectangular end, the triangular end being coupled with the side walls of the post device and the rectangular end being coupled with the rectangular loop, wherein the rectangular loop is parallel to the ground when the post device is angled to the ground.

9. The system of claim 8, wherein the post device further comprises: a hinge, wherein the hinge is between the first and second end of the post device and the hinge folds the post device into two posts.

10. The system of claim 8, wherein the parallel plates straddle and extend outward from the front wall of the post device.

11. The system of claim 8, further comprising: a connecting hinge, the connecting hinge connecting the hitch connecting device to the first end of the post device, wherein the connecting hinge adjusts an angle of the post device to the ground.

* * * * *